United States Patent Office 3,398,108
Patented Aug. 20, 1968

3,398,108
VINYL HALIDE RESINS STABILISED WITH METAL-ORGANIC COMPOUNDS
John H. W. Turner, Chapel-en-le-Frith, England, assignor to Hardman & Holden Limited, Manchester, Lancashire, England, a British company
No Drawing. Filed Mar. 30, 1964, Ser. No. 355,960
Claims priority, application Great Britain, Apr. 5, 1963, 13,597/63
5 Claims. (Cl. 260—23)

ABSTRACT OF THE DISCLOSURE

This invention relates to a vinyl resin which has been stabilized by incorporating therein a metal-organic compound containing at least one divalent metal, and at least one trivalent or tetravalent element joined together through oxygen atoms, together with carboxylic acid radicals and hydrocarbonoxy radicals attached to the divalent and/or trivalent or tetravalent atoms or mixtures of two or more such metal organic compounds. The metal-organic compound is preferably used to the extent of about 3⅓ to 5 parts by weight of said compound per hundred parts of resin.

---

This invention relates to methods of stabilising resin compositions containing vinyl halide polymers or copolymers, and to stabilised compositions containing vinyl halide polymers or copolymers.

According to the invention, stabilisation of a vinyl resin composition is effected by incorporating therein a metal-organic compound containing at least one divalent metal, and at least one trivalent or tetravalent element joined together through oxygen atoms, together with carboxylic acid radicals and hydrocarbonoxy radicals attached to the divalent and/or trivalent or tetravalent atoms or mixtures of two or more such metal organic compounds.

The invention further comprises stabilised resin compositions containing a vinyl halide polymer or copolymer and a metal-organic compound as defined above.

The metal-organic compounds may be used in conjunction with other compounds which are stabilisers for vinyl resins, such as calcium stearate.

The compounds may be formed by condensing aluminium alkoxides, or ortho- or meta-boric acid esters in a proportion of up to about 2:1 with one or more salts of divalent metals such as barium, calcium, cadmium, lead, magnesium and strontium prepared by reacting these metals with monocarboxylic acids including acetic acid, propionic acid, methacrylic acid, tall oil and tall oil fatty acids, Versatic acid tertiary carboxylic acids which are fully saturated and highly branched, naphthenic acids and synthetic carboxylic acids in the range $C_7$–$C_{24}$. A minor proportion of the metal salts may be salts of dicarboxylic acids such as maleic acid, phthalic acid, sebacic acid, azelaic acid and dimerised fatty acids. The process for preparing these compounds is described in our copending application Ser. No. 259,396, now Patent No. 3,296,242.

The compounds which may be used include cadmium aluminium stearate, cadmium aluminium tallate, zinc aluminium tallate, and zinc aluminium stearate, which have the aluminium and the zinc or cadmium atoms linked through oxygen atoms of the formula X—M—O—Al—O—Al—O—M—X
          |        |
          X       X where M=cadmium or zinc and X=stearate or tallate.

The compounds may also be prepared by the reaction of an alkoxide of a tetravalent element such as silicon, titanium or zirconium with one or more carboxylic acid salts of a divalent element or elements with the formation of volatile or non-volatile ester. For example, two molecules of zinc acetate oleate may be reacted with one molecule of tetra-ethyl ortho silicate with the formation of 2 molecules of ethyl acetate which is distilled off during processing leaving a diluent free condensate. The method of preparation is described in our copending application Ser. No. 331,911, filed Oct. 19, 1963.

Other compounds may be used in which divalent alkaline earth metals are linked through oxygen with carbon; including those derived from the reaction of carbon dioxide with the basic soaps of the alkaline earth metals.

The invention is illustrated by the following examples:

EXAMPLE I

Cadmium aluminium stearate, $CdAlStO_2$, and cadmium aluminium tallate, $CdAlT_2OH$, were tested as P.V.C. stabilisers in comparison with a commercial cadmium/barium liquid stabiliser (a mixture of cadmium and barium phenates with some triphenyl phosphite), of a type commonly used, in a P.V.C. plastisol composition.

A premix of equal proportions of the stabilisers and a plasticiser (dioctyl phthalate) was made. This was then incorporated into a P.V.C./plasticiser paste to give the following compositions:

|  | Parts by weight |
|---|---|
| P.V.C. (Breon 121) | 60 |
| Dioctyl phthalate | 38 |
| Stabiliser/plasticiser blend | 4 |

Samples of pastes containing the different stabilisers were gelled by heating at 164° C. and heat stability determined by heating samples cut from the gelled sheets, in an oven at 178° C. for different periods of time.

It was found that the P.V.C. compound containing the cadmium/barium stabiliser had become almost black in 45 minutes at 178° C., while at 60 minutes at 178° C. the compound containing the cadmium/aluminium tallate was reddish-yellow and the compound containing the cadmium/aluminium stearate was only yellow in colour.

EXAMPLE II

Calcium stearate has been used as a non-toxic heat stabiliser for P.V.C. for many years. Improved stability can be obtained by using a blend (still non-toxic) of calcium stearate and zinc aluminium tallate.

A comparison was made between calcium stearate alone and a blend in the proportions of 3 parts calcium stearate to 1 part of zinc aluminium tallate, again in a plastisol mix. The composition was as follows:

|  | Parts by weight |
|---|---|
| Breon 121 | 60 |
| Dioctyl phthalate | 35 |
| Epoxidised oil | 5 |
| Stabiliser | 3 |

Samples were gelled as before and heated for different periods of time at 195° C. The compound containing calcium stearate alone, became red in colour after 45 minutes heating, while that containing the stabiliser blend was still only yellow in colour at this time.

EXAMPLE III

Zinc aluminum tallate was tested as a secondary stabiliser in part replacement of a commercial cadmium/barium liquid stabiliser, again in a plastisol mix. The composition was as follows:

| | Parts by weight |
|---|---|
| Breon 121 | 60 |
| Dioctyl phthalate | 35 |
| Epoxidised oil | 5 |
| Stabiliser | 2 |

A comparison was made between the cadmium/barium stabiliser alone and a blend in the proportions of 2 parts cadmium/barium stabiliser to 1 part zinc aluminium tallate.

Samples were gelled as before and heat stability determined for varying periods of time at 195° C.

After heating for 60 minutes at 195° C. the compound containing the cadmium/barium stabiliser was a deep orange in colour, while that containing the stabiliser blend was only yellow in colour at the same time of heating.

EXAMPLE IV

Zinc aluminium tallate was tested as a heat stabiliser in comparison with calcium stearate in a plastisol mix, using the following formulation:

| | Parts by weight |
|---|---|
| Breon 121 | 60 |
| Dioctyl phthalate | 35 |
| Epoxidised oil | 5 |
| Stabiliser | 3 |

Samples were gelled as before and heated for 30 minutes at 178° C. The compound containing calcium stearate was yellow-orange in colour while that containing zinc aluminium tallate was practically colourless.

Double metal compounds have excellent wetting and dispersion properties for fine particle pigments and fillers. Consequently they can be used to disperse pigments and fillers in P.V.C. compositions, in addition to enhancing heat stability.

EXAMPLE V

Cadmium silico-tallate of the formula $$Si(OCdT)_2(OC_2H_5)_2$$

was tested as a heat stabiliser in comparison with a cadmium/barium liquid stabiliser in a plastisol mix, using the following formulation:

| | Parts by weight |
|---|---|
| Breon 121 | 60 |
| Dioctyl phthalate | 35 |
| Epoxidised oil | 5 |
| Stabiliser | 2 |

Samples were gelled as before and heat stability determined at 195° C.

After heating for 45 minutes at 195° C., the compound containing the cadmium/barium stabiliser was deep orange in colour, while that containing the cadmium silico-tallate was only light yellow in colour.

EXAMPLE VI

A comparison was made between barium stearate and barium zirconato-propionate versatate p-octyl phenate of the formula

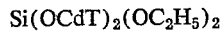

(where V represents the acid radical of Versatic acid) used as a 60% solution in white spirit, 2 parts of stabiliser were added using the same formulation as in Example V and samples were gelled as before and heated for 30 minutes at 180° C. Both compounds were orange in colour the one containing barium zirconato propionate versatate p-octyl phenate being lighter in colour than that containing barium stearate.

EXAMPLE VII

A comparison was made between a blend of cadmium and barium stearate on one hand and combinations of the barium and cadmium compounds of the present invention on the other hand, in a flexible calendering grade of compound. The materials tested were barium aluminium stearate with cadmium versatate iso-butyl orthoborate of the formula V—Cd—O—B(OC$_4$H$_9$)$_2$ (where V represents the acid radical of Versatic acid) and cadmium silicon versatate/naphthenate of the formula $$Si(OCdY)_2(OC_2H_5)_2$$

where Y represents a radical derived from a mixture of approximately 60% naphthenic acid and 40% Versatic acid.

Base formulation

| | Parts by weight |
|---|---|
| P.V.C. Corvic D65/6 | 100 |
| Dioctyl phthalate | 45 |
| Epoxidised oil Abarac A (Abarac A is an epoxidised oil, oxirane-oxygen content 6 to 6.5% and iodine value 7 maximum) | 5 |
| Triphenyl phosphite | 1 |
| Stearic acid | 0.5 |

The following combinations were compared:

(1) 3.0 parts barium stearate and 0.825 parts cadmium stearate.
(2) 3.0 parts barium aluminium stearate and 0.75 part versatate iso-butyl orthoborate.
(3) 3.0 parts barium aluminium stearate and 0.60 part cadmium silicon versatate/naphthenate.

The proportions of the cadmium compounds were varied to give approximately equal proportions of cadmium in each P.V.C. compound.

These three compositions were milled for 15 minutes at 160° C. on a two roll mill. After this process compound No. 1, containing the barium and cadmium stearates was a light yellow in colour while the other two compounds were practically colourless.

Samples were then cut from the sheets and heated in an oven at 195° C. up to 45 minutes. After this time compound 1 containing barium and cadmium stearates was orange in colour while the other two compounds were only yellow.

Double metal compounds have excellent wetting and dispersion properties for fine particle pigments and fillers. Consequently they can be used to disperse pigments and fillers in P.V.C. compositions, in addition to enhancing heat stability.

What is claimed is:

1. A vinyl halide resin composition, stabilised by the incorporation therein of about 3⅓–5 parts by weight per hundred parts of resin of a metal-organic compound which contains at least one element selected from the group consisting of the trivalent elements aluminium and boron and the tetravalent elements silicon, titanium and zirconium, at least one divalent metal selected from the group consisting of magnesium, calcium, strontium, barium, zinc, cadmium and lead, the divalent and trivalent or tetravalent atoms being linked through oxygen atoms, and at least one acyloxy radical attached to a divalent metal, any residual valencies of the trivalent or tetravalent elements being satisfied by radicals selected from the group consisting of acyloxy, alkoxy and aryloxy radicals.

2. A vinyl halide resin composition as claimed in claim 1, stabilised by the incorporation therein of about 3⅓–5 parts by weight per hundred parts of resin of a metal-organic compound of the formula

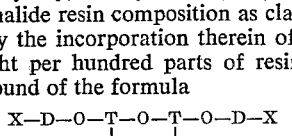

where D is an element selected from the group consisting of magnesium, calcium, strontium, barium, zinc, cadmium, and lead, T is an element selected from the group consisting of aluminium and boron, X is an acyloxy radical.

3. A vinyl halide resin composition as claimed in claim 1, stabilised by the incorporation therein of about 3⅓–5 parts by weight per hundred parts of resin of a metal-organic compound of the formula

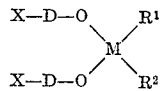

where M is an element selected from the group consisting of silicon, titanium and zirconium, X is an acyloxy radical, $R^1$ and $R^2$ are radicals selected from the group consisting of acyloxy, alkoxy and aryloxy radicals and D is an element selected from the group consisting of magnesium, calcium, strontium, barium, zinc, cadmium and lead.

4. A vinyl halide resin composition as claimed in claim 1, stabilised by the incorporation therein of about 3⅓–5 parts by weight per hundred parts of resin of a metal-organic compound of the formula

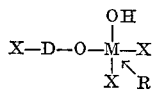

where D is an element selected from the group consisting of magnesium, calcium, strontium, barium, zinc, cad-mium and lead, M is an element selected from the group consisting of silicon, titanium and zirconium, X is an acyloxy radical, R is a radical selected from the group consisting of acyloxy, alkoxy and aryloxy radicals.

5. A vinyl halide resin composition as claimed in claim 1, stabilised by the incorporation therein of about 3⅓–5 parts by weight per hundred parts of resin of a metal-organic compound of the formula

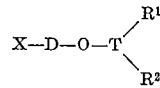

where D is an element selected from the group consisting of magnesium, calcium, strontium, barium, zinc, cadmium and lead, T is an element selected from the group consisting of aluminium and boron, X is an acyloxy radical, $R^1$ and $R^2$ are radicals selected from the group consisting of acyloxy, alkoxy and aryloxy radicals.

References Cited
UNITED STATES PATENTS

| | | | |
|---|---|---|---|
| 2,671,064 | 3/1954 | Cowell et al. | 260—23 X |
| 3,214,451 | 10/1965 | Michaels et al. | 260—414 |
| 3,225,075 | 12/1965 | Hendricks et al. | 260—414 |

DONALD E. CZAJA, *Primary Examiner.*

R. A. WHITE, *Assistant Examiner.*